US006438230B1

(12) United States Patent
Moore

(10) Patent No.: US 6,438,230 B1
(45) Date of Patent: Aug. 20, 2002

(54) DATA MAPPING METHOD AND APPARATUS WITH MULTI-PARTY CAPABILITY

(75) Inventor: David Moore, North Bend, WA (US)

(73) Assignee: Coinstar, Inc., Bellevue, WA (US)

( * ) Notice: Subject to any disclaimer, the term of this patent is extended or adjusted under 35 U.S.C. 154(b) by 0 days.

(21) Appl. No.: 09/662,413

(22) Filed: Sep. 14, 2000

Related U.S. Application Data

(60) Provisional application No. 60/154,122, filed on Sep. 15, 1999.

(51) Int. Cl.[7] .............................. H04L 9/06; H04L 9/20; H04L 9/28
(52) U.S. Cl. ............................. 380/42; 380/28; 380/43; 380/46
(58) Field of Search .............................. 380/28, 41, 42, 380/43, 46, 51, 55; 708/483

(56) References Cited

U.S. PATENT DOCUMENTS

| 5,193,115 A | 3/1993 | Vobach | 380/46 |
| 5,577,122 A | 11/1996 | Schipper et al. | 380/28 |
| 5,793,869 A | 8/1998 | Claflin, Jr. | 380/49 |
| 5,950,173 A | 9/1999 | Perkowski | 705/26 |
| 6,026,376 A | 2/2000 | Kenney | 705/27 |
| 6,055,573 A | 4/2000 | Gardenswartz et al. | 709/224 |

*Primary Examiner*—Gilberto Barron
*Assistant Examiner*—Justin T. Darrow
(74) *Attorney, Agent, or Firm*—Perkins Coie LLP

(57) ABSTRACT

Mapping or encryption of a message made up of characters from a character set is provided. Each character in the character set is associated with one or more disjoint real number intervals. Each character in the message is represented by a real number randomly selected from one of the intervals with which the character of the character set is associated. In some aspects, the resulting set of real numbers is translated to another set of real numbers by the application of a translation function or successive application of two or more translation functions. The translation functions never result in two different real numbers being translated to a single number.

18 Claims, 10 Drawing Sheets

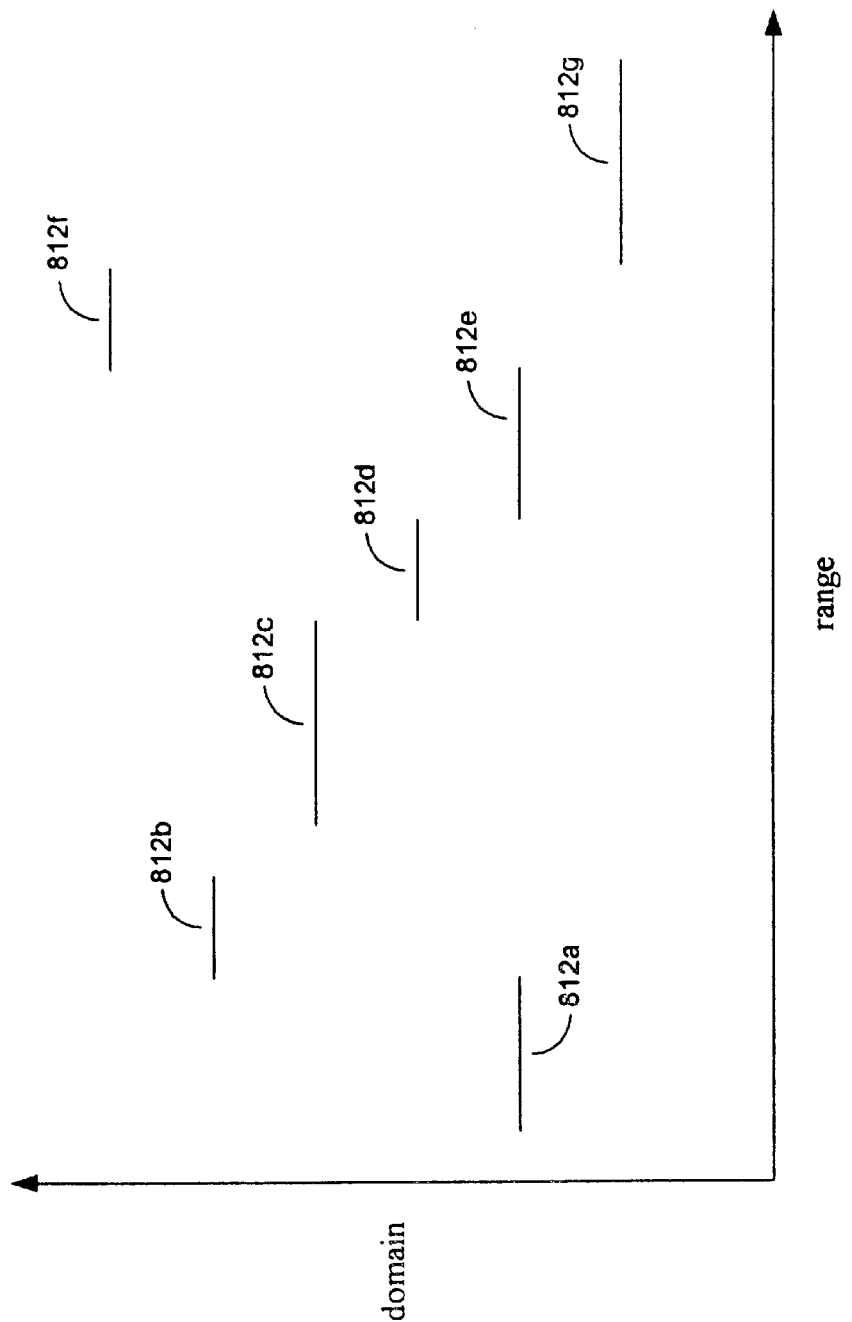

DATA MAPPING METHOD AND APPARATUS WITH MULTI-PARTY CAPABILITY

This application claims priority from U.S. Provisional Patent Application No. 60/154,122 filed on Sep. 15, 1999. The entire disclosure of the provisional application is considered to be part of the disclosure of the accompanying application and is hereby incorporated by reference.

The present invention relates to encryption or other data mapping and in particular to mappings from discrete characters to value ranges preferably permitting multiple parties to contribute to the encryption.

BACKGROUND INFORMATION

A number of data mapping or encryption systems involve mapping discrete characters or "tokens" from a character set onto a second plurality of characters. A simple example (and one which is relatively insecure) is a one-to-one cipher in which a set of characters, such as the letters of the English alphabet are mapped onto the same set of characters (i.e. mapped onto the characters of the English alphabet, in a "jumbled" order). A related (but still insecure) example is the one-to-one mapping of a character set onto a different character set (such as the mapping of characters of the English alphabet onto the well known ASCII codes for each letter. These simple examples have the advantage that the encryption and decryption are computationally non-demanding. Unfortunately, it is relatively easy for non-authorized persons to decrypt or "break" these types of encryptions or mappings.

As is well known to those of skill in the art, many more sophisticated types of encryption have been developed. All too often, techniques of code breaking have kept pace with developments in the encryption field. Many code breaking techniques depend on recognizing certain characteristics of the original text or language which may remain relatively invariant under the encryption processes. For example, in the simple examples described above, the frequency of occurrence of any given letter of the English alphabet in an English text (of sufficient length) is invariant after the one-to-one mappings described above. Thus, a sufficiently long cyphertext produced by the one-to-one techniques described above, might be broken by assuming the most-frequently-appearing character in the cyphertext corresponds to the letter which occurs most frequently in typical English language texts (i.e. the letter "e"), the second-most-frequent character in the cyphertext corresponds to the second most frequently used character in the English language, and so forth. Other relatively invariant language characteristics (such as relative frequency of word lengths, and the like), can similarly be of assistance to a would-be code-breaker.

Accordingly, it would be useful to provide encryption scheme which avoids the inclusion of information in the cyphertext which may assist in code-breaking. In particular, it would be useful to provide an encryption system which is not a one-to-one mapping.

As various encryption schemes have been developed, the encryption processes have often become relatively complex, to the point that many modem encryption and decryption processes are impractical without the use of computers. Even using computers, some encryption schemes can become so complex that encryption or decryption processes consume a perceptible, and in some cases unacceptable, delay in communications. Accordingly, it would be useful to provide an encryption scheme which achieves a desirable level of security but which is computationally relatively rapid.

Although the simple examples above were described in the context of a two-party transaction, there are situations in which a communication or transaction preferably involves three or more parties. For example, when it is desired to transfer funds from bank A to bank B, it may be desirable for the receiving bank B to have assurance in the validity of a transfer message, preferably from a third party such as a Federal Reserve Branch and/or a fourth party such as a parent bank of the originating "branch" bank. Accordingly, it would be useful to provide a system for encrypting a message in which two or more different parties participate in the encryption scheme, preferably such that some or all verifying entities cannot, by themselves, decrypt the resulting cyphertext.

SUMMARY OF THE INVENTION

The present invention involves a one-to-many mapping of a character set and/or an encryption scheme in which multiple parties can participate. As used herein, a "character" or "token" can be any unit which is to be encrypted including English or foreign letters, words, numbers, punctuation marks, symbols and the like.

In one aspect of the invention, a portion of the real number line is partitioned into a plurality of disjoint intervals and each character is mapped to a point in one (or more) of the intervals. One advantage to the mapping of a given unique-character to two or more intervals is that even if the significance of one of the intervals is ascertained by a would-be code-breaker, this will provide the code-breaker only with the plaintext characters which were mapped onto that interval and other instances of the same unique character, mapped onto other intervals, will not be determinable from a knowledge of the significance of the interval.

When a plaintext is encrypted, for each character of the plaintext, one of the intervals (if there is more than one) to which that character is mapped is selected (preferably randomly) and a real number which lies within that interval is selected (preferably randomly) for use as the encrypted form of that character. Thus, using this type and level of encryption, an English text would be represented by a series of real numbers. To decrypt such a series of real numbers and recover the original plaintext, the decrypting party can use information about the mapping of the characters to the intervals. Thus, for each real number in the cyphertext, the decrypting party will determine within which interval the real number lies. The decrypting party will then determine which character is mapped to that interval and will thus be able to recover the character of the plaintext corresponding to that real number of the cyphertext. Thus, even though a given letter may occur numerous times in the original plaintext, most, or preferably all, occurrences of that letter will be represented by different real numbers in the cyphertext. By judicious selection of the intervals and mappings (e.g. as described below), the resulting cyphertext can be made to resemble a plurality of numbers which are randomly distributed across a portion of the real number line, and thus the cyphertext can be substantially devoid of letter-frequency information or similar information sometimes used in code-breaking. Once a text is in the form of a series or plurality of real numbers, it is possible to perform additional mappings on the real numbers. Preferably, each such additional mapping is a one-to-one mapping, such as by application of a function which is monotonic at least over the portion of the real number line where the values of the text or cyphertext lie. It is possible to provide several levels of encryption in this fashion so that the final (communicated) cyphertext is the product of two or more functions. In this aspect of the invention, in order for the decrypter to recover the original plaintext, the decrypter will use not only the one-to-many mapping but also the transformation function or functions (or composites thereof). Preferably, although the parties may have agreed that one or more transformation functions are to be used, e.g. to indicate third party verification, as described more thoroughly below), no single party (other than the authorized sending and receiving parties) can use knowledge of a single transformation function (or fewer than all transformation functions) to recover the plaintext (or, preferably, even any substantial portion of the plaintext). In this way, several parties may contribute to the encryption process (e.g. to indicate their verification or authorization of the message) without any of the third parties (who are verifying the message) having sufficient information to decrypt the cyphertext.

Preferably, the functions, which need only be, e.g., monotone (over an interval) real number functions, are selected which are relatively rapid to compute, such as polynomial functions.

BRIEF DESCRIPTION OF THE DRAWINGS

FIG. 8 illustrates a non-monotonic mapping of a type that can be used according to one embodiment of the present invention.

DETAILED DESCRIPTION

Figure 1:
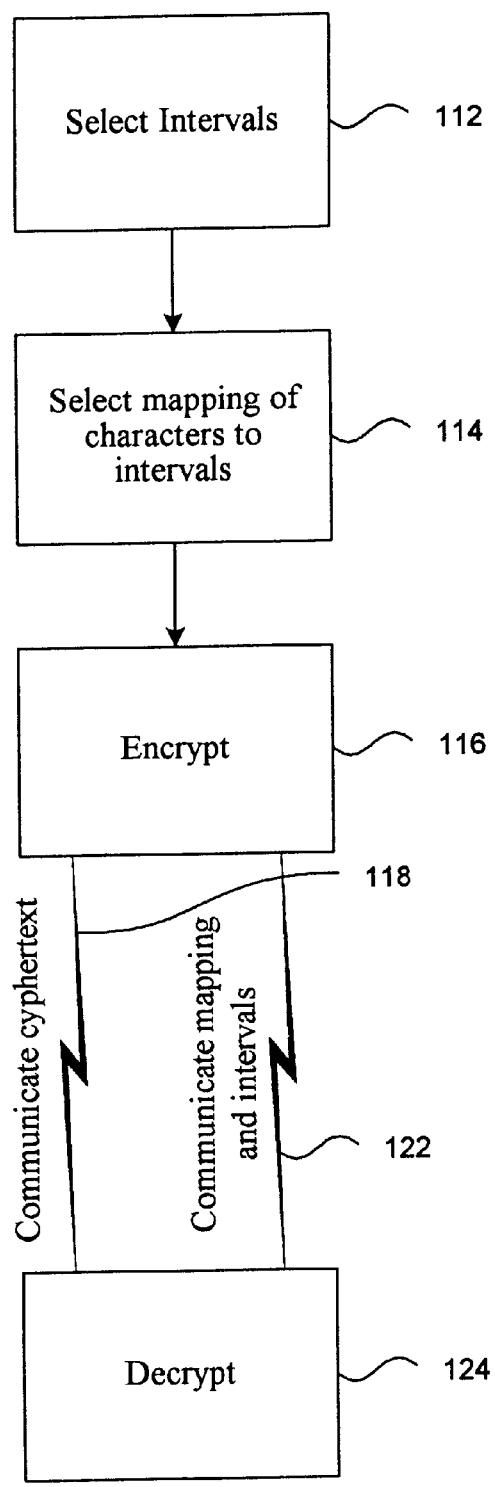
FIG. 1 is a flow chart depicting a data mapping procedure according to an embodiment of the present invention.

The present invention includes a recognition of certain problems found in previous data mapping or encryption schemes.

According to one embodiment of the invention, real number intervals are selected 112 within a range of the real number line. Although a number of selection processes can be used, in one embodiment, the selection is performed on a computer (which will represent the source of the cyphertext transmission 212, FIG. 2) and can be performed, for example, using the procedure described more fully below in connection with FIG. 3. After intervals (or, more properly speaking, one or both endpoints of intervals) are selected, each character of the character set (which makes up the various characters that appear in the plaintext, "unique characters") is mapped onto one or more of the intervals. An example of a procedure that can be used for such mapping is described more fully below in connection with FIG. 4.

In order to encrypt a plaintext 116, each character of the plaintext is replaced by a real number which is randomly selected from one of the intervals to which that character is mapped, e.g. as described more fully below in connection with FIG. 5B. The cyphertext can then be communicated 118 to the destination computer 214 (FIG. 2) e.g. over a first communication link 216. Since the text has been encrypted, the communication link 216 used for communicating the cyphertext 118 does not need to be a particularly secure communication link.

Figure 2:
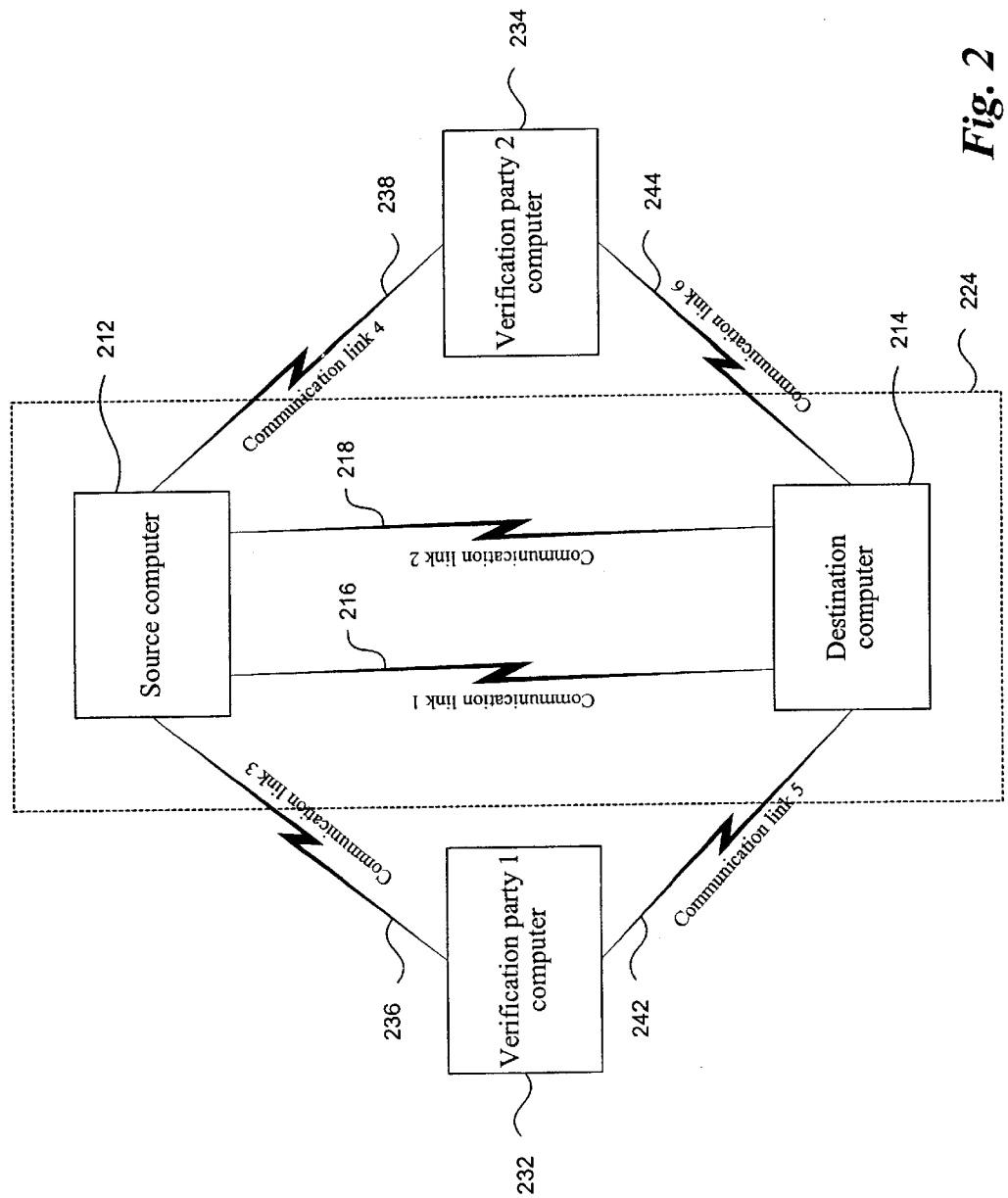
FIG. 2 is a block diagram depicting a multi-party computer and communication system of type which can be used in connection with embodiments of the present invention.

In order for the destination computer 214 to recover the plaintext from the cyphertext, the destination computer 214 will have to use information relating to the mapping and the intervals. Thus, in the procedure of FIG. 1, the mapping and interval information is also communicated 122. In the embodiment of FIG. 2, the communication and mapping information can be communicated over a second communication link 218. It is possible to achieve a relatively high degree of security for the present procedure even if the second communication link 218 is not particularly secure, if, for example, the second communication link 218 is different from the first communication link 216, (e.g. a telephone link verses an Internet link) and/or is performed at a different time than the communication of the cyphertext 118 (even if performed over the same communication medium) since it is relatively more difficult for a potential eavesdropper to be able to recover both the first communication 118 and second communication 122 if these are performed over different links, or at different times. Moreover, even if a potential eavesdropper intercepted both the communication of the cyphertext 118 and the mapping and interval information 122, the eavesdropper would not necessarily be able to determine that the mapping and interval information are related this particular cyphertext, particularly if there were multiple cyphertexts and/or multiple sets of mapping and interval information being transmitted. However, if additional security is desired, it is possible to protect one or both of the communication links 216, 218, e.g. by using another type of encryption system, such public key encryption, or other well known encryption techniques, e.g. for encrypting the mapping and interval information 122. In any case, the encryption/data mapping procedure of FIG. 1 can be implemented using only source and destination computers and one or two communication links 224, and thus represents two-party encryption (multi-party encryption will be described below).

After the destination computer 216 has received the cyphertext and is in possession of the mapping and interval information, the destination computer 214 can recover the plaintext from the cyphertext by a decryption procedure 124, generally identifying an interval in which the real number lies and substituting the character which was mapped to that interval, as described more fully below in connection with FIG. 5C.

A number of procedures can be used for generating intervals and two examples will be provided as illustrations. In a first example:

A. For each of the N characters of the character set, create an object containing:

the character (Character);

the number of subintervals to assign to the character (IntervalCount);

a value between 0.0 and 1.0 representing the relative proportion of the total interval that the character's subintervals must represent (Proportion);

a counter (Count) to be used in step #3 below;

a value (Sum) to represent the sum of the lengths of subintervals for this character.

The sum of all values of Proportion must equal 1.

The value of Proportion may be set equal to the relative frequency of occurrence of the character in "typical" text of the given language.

Initialize Count and Sum to 0, and put these N objects into an array C.

B. Select an interval [X, Y] of the real number line (with X<Y).

C. Construct an array S of $$M = \sum_{k=1}^{N} C[k] \cdot Count$$

objects, each to contain:

an index (Index) referencing an element of the array C;

a subinterval lower bound $I_L$; and a subinterval upper bound $I_U$.

Construct each element as follows:

Set LowerBound=X

For j=1 to M:

```
{
    Select at random an element i of C for which:
        C[i].Count <C [i].IntervalCount
    Set [j].Index = i
    Set C[i].Count + = 1
    Set S[j].I_L = LowerBound
    ifC[i].Count = C[i].IntervalCount
        Set S[j].I_U = S[i].I_L + (C[j].Proportion * (Y-X) - C[i].Sum)
    otherwise
        Select a value α such that:
        S[j].I_L α < S[j].I_L + (c[i].Proportion * (Y - X) - C[i].Sum)
        Set S[j].I_U = α
        (Ideally α should be a random value; but it would be
        best to prevent situations in which any subinterval length is
        too close to zero.)
    Set C[i].Sum + = S[j].I_U - S[j].I_L
    Set LowerBound = S[j].I_U
}
```

As an illustration of the first interval-generation example, suppose the character set consists of the characters:

A, B, C, D, E and that we wish to assign the following values for the number of subintervals and the relative frequency of each:

| Character | Number of subintervals | Relative Frequency |
|---|---|---|
| A | 2 | 0.20 |
| B | 1 | 0.18 |
| C | 3 | 0.16 |
| D | 1 | 0.21 |
| E | 5 | 0.25 |

Step 1: The 5 element array C will be as follows:

C[1]={A, 2, 0.20, 0, 0}

C[2]={B, 1, 0.18, 0, 0}

C[3]={C, 3, 0.16, 0, 0}

C[4]={D, 1, 0.21, 0, 0}

C[5]={E, 5, 0.25, 0, 0}

Step 2: Set [X,Y]=[2.0, 10.0]

Step 3:

The array S will have 12 elements.

Set LowerBound=2.0

Set j=1

Randomly pick an index i of the array C for which:
C[i].Count C[i].IntervalCount Say that it is 3.

Then:

S[1].Index=3

C[3].Count=1

S[1].$I_L$=2.0

Select a value α such that:

2.0<α<2.0+0.16*(8.0)−0.0)=3.28

Say that the value of α=2.44

S[1]..$I_U$=2.44

C[3].Sum=0.44

LowerBound=2.44

S[1]={3, 2.0, 2.44}

C[3]={C, 3, 0.16, 1, 0.44}

Set j=2

Randomly pick an index i of the array C for which:
C[i].Count<C[i].IntervalCount Say that it is 2.

Then:

S[2].Index=2

C[2].Count=1

S[2].$I_L$=2.44

Because there is only to be 1 interval for B,

S[2]..$I_U$=2.44+0.18*8=3.88

C[2].Sum=1.44

LowerBound−3.88

S[2]={2, 2.44, 3.88}

C[2]={B, 1, 0.18, 1, 1.44}

Continue as above for the remaining 10 elements of the array S.

Figure 3:
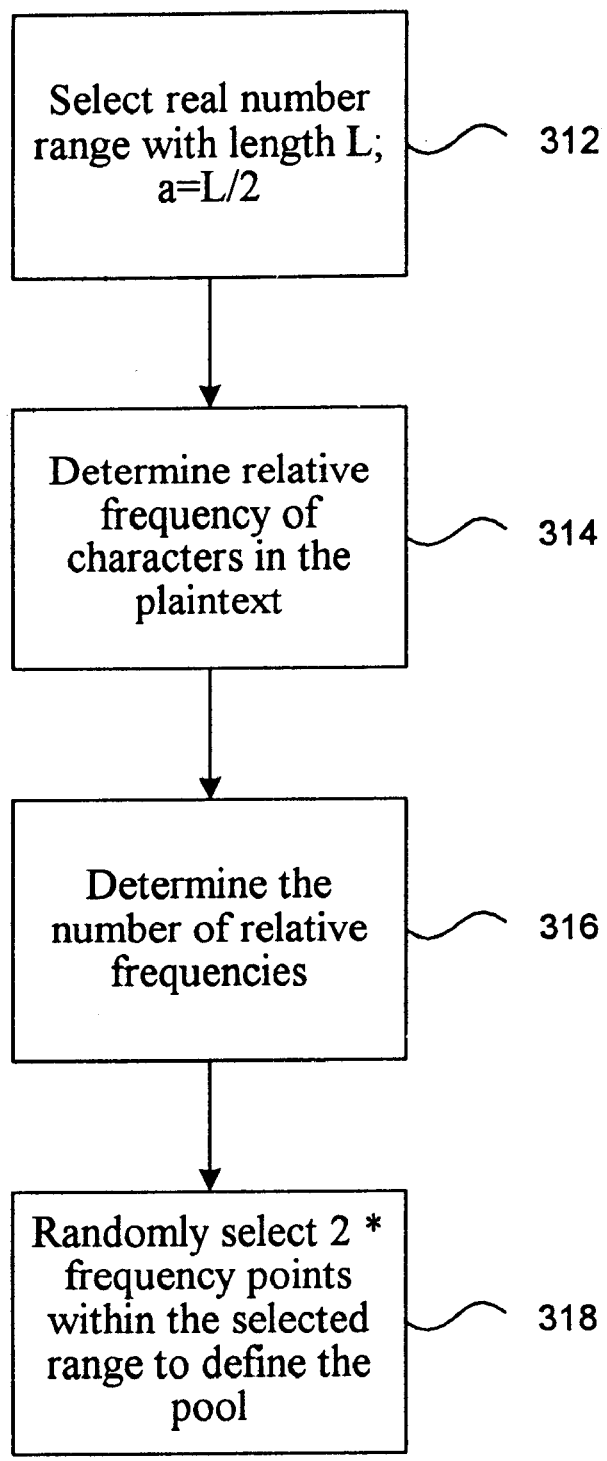
FIG. 3 is a flow chart depicting an interval selection procedure according to an embodiment of the present invention.

In a second example of a procedure for selecting intervals, as depicted in FIG. 3, the procedure can begin with selection of a real number range, within which the intervals will lie. The range which is selected can theoretically be any real number range. Any real number range (no matter how small) will contain an infinite number of real number points within the range and thus there will always be sufficient numbers to achieve the goals of the present invention. However, because present computing systems represent real numbers using a finite number of bits or digits, for any given interval, there are a finite number of real numbers that can be distinguishably represented in computers and the intervals should be selected such that the number of real numbers that can be distinguishably represented by the computer in the interval is sufficiently large, such as being at least equal to (preferably at least twice) the character-length of the plaintext to be encrypted. This will make it possible for most, preferably all, characters in the plaintext to be represented by a unique real number in the cyphertext.

Moreover, a real number range which is excessively large will require relatively long numbers to represent points within the range and accordingly the range should not be so large that truncation and/or rounding errors (introduced in the representation of large numbers) introduces errors which are sufficiently large as to make it difficult to identify the intervals within which certain real numbers lie. As will be understood by those of skill in the art, the size of truncation or rounding errors would be affected by such choices as whether to perform all calculations in binary representation or to convert between digital and binary representations (which can introduce another level of rounding error) and by the choice of whether to use single precision, double precision, triple precision calculations and the like.

Figure 5A:
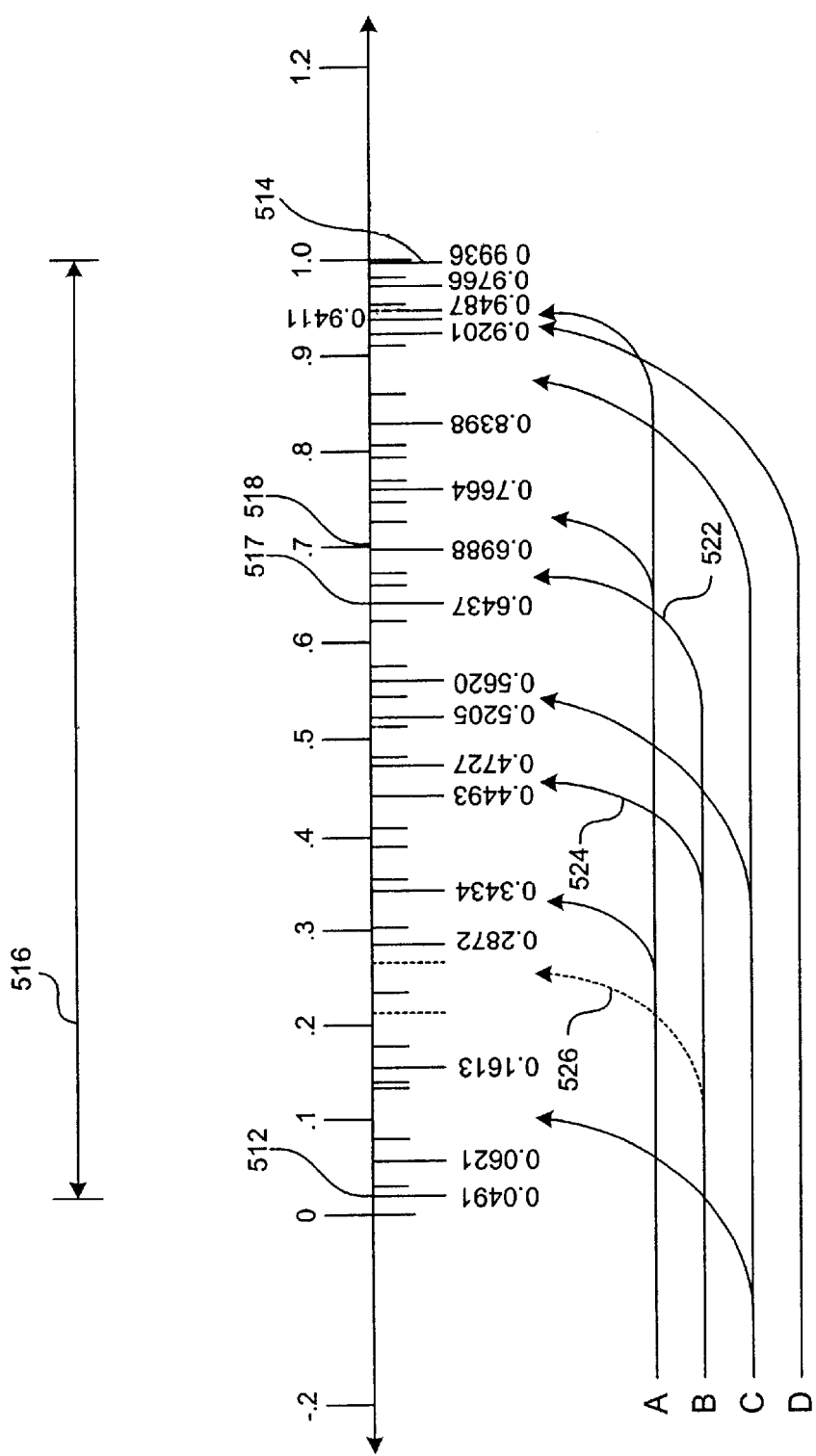
FIG. 5A is an illustration of one example of mapping characters onto real number intervals according to an embodiment of the present invention.

FIG. 5A is a graphic depiction of the result of one example of an interval selection and mapping scheme. In the example of FIG. 5A, a plaintext (e.g. as illustrated in Table I), is made up of pattern of four "unique characters" or tokens "A", "B", "C" and "D". In the example of FIG. 5A, the real number range which is selected 312 has a lower bound 512 of 0.0491 and an upper bound 514 of 0.9936 providing a total length (L) of the range 516 equal to 0.9445 (see Table II). For purposes described below, a constant "H" is defined which is equal to one half the length 516 (H=$\frac{1}{2}$=0.47225).

TABLE I

Plaintext

| B | A | C | C | C | A | D | B | C | A | C |
|---|---|---|---|---|---|---|---|---|---|---|
| A | C | B | C | A | C | C | B | A | A | C |
| A | C | A | B | C | C | B | A | C | B | D |
| A | A | C | B | C | A | C | C | A | C | B |

TABLE II

| CHARACTER | INTERVAL | BOUNDS | $I_{nj}$ | CHARACTER INTERVALS LENGTH |
|---|---|---|---|---|
| A | $M_{1_A}$ | {0.2872, 0.3434} | .0562 | .1517 |
|   | $M_{2_A}$ | {0.6988, 0.7664} | .0676 |   |
|   | $M_{3_A}$ | {0.9487, 0.9766} | .0279 |   |
| B | $M_{1_B}$ | {0.4493, 0.4727} | .0234 | .0785 |
|   | $M_{2_B}$ | {0.6437, 0.6988} | .0551 |   |
| C | $M_{1_C}$ | {0.0621, 0.1613} | .0992 | .2210 |
|   | $M_{2_C}$ | {0.5205, 0.5620} | .0415 |   |
|   | $M_{3_C}$ | {0.8398, 0.9201} | .0803 |   |
| D | $M_{1_D}$ | {0.9201, 0.9411} | 0.210 | .0210 |
|   |   |   | Total | 0.4722 |
| Real No. Range |   | {0.0491, 0.9936} |   | 0.9445 |

There are numerous ways in which the range 516 can be partitioned or subdivided into intervals. The total number of intervals needed will be at least equal to the number of unique characters which occur in the plaintext (i.e. 4, in the example of Table I). Thus, the present invention could be implemented by partitioning the real number range into four intervals, in this example. In other embodiments, any or all of the four unique characters in the plaintext can be mapped onto two or more intervals. Thus embodiments of the present invention can be implemented, in the context of the example of Table I, using five or more intervals.

Since decryption (described below) will require that an interval be associated with no more than one of the four unique characters, the intervals must be disjoint (non-overlapping). The intervals need not be, but some or all may be, spaced-apart (such that the lower bound of one interval is greater than the upper bound of the next-lower interval). One advantage of providing non-spaced-apart intervals ("contiguous") is that the definition of the intervals in the real number range can be communicated using only a single real number to define each interval, such as using the lower bound of each interval, since (except for the highest interval) the upper bound of any interval will equal the lower bound of the next-higher interval). Thus, in this system, a partition into R intervals can be communicated using R+1 real numbers. However, if the intervals are spaced-apart, the lower bound of each interval must be separately defined and thus communication of R spaced-apart intervals would require 2 R real numbers.

Because decryption also involves determining within which interval a particular real number lies, the real numbers that will make up the cyphertext (as described below) should not be so close to an interval endpoint that rounding error could cause the decryption procedure to erroneously consider that point to lie outside the interval. If all intervals are spaced-apart sufficiently far (such as at least equal to the rounding error, preferably after considering the effect of any monotonic function transforms as described below) real numbers would never be mis-assigned to an incorrect mapped interval as a result of rounding. However, a real number which is within an interval, but near an endpoint, could, through rounding error, be erroneously considered to be not a part of any mapped interval.

Another manner of handling rounding error in this regard is to assure that no random numbers are used as part of the mapped numbers in the cyphertext which are within one (or two) rounding error distances of an interval end point. This procedure, besides introducing additional computational test steps, and requiring a computation or estimate of rounding error (preferably including the effect of any transforms) also could provide the astute code-breaker with information about where interval boundaries may lie (since this procedure would result in a cyphertext which had no real numbers in areas of the number line near the interval endpoints). Accordingly, to disguise the location of the interval end points, embodiments of the present invention can also include inserting, into the cyphertext (preferably randomly) "red herring" real numbers which lie in the spaces between the mapped intervals (or within a predefined distance of the interval end points) and wherein such "red herring" real numbers will be ignored when they occur in the cyphertext.

By providing a partition of the real number range in which a relatively large portion of the range, such as a total of 50% or, preferably more, is made up of inter-intervals spaces, i.e. non-mapped intervals, the cyphertext can preferably include a sufficient number of (and preferably a proper distribution of) "red herring" real numbers that the resulting cyphertext will have the appearance of real numbers which are randomly distributed over the real number range, thus providing little information regarding interval definitions, letter frequencies and the like.

Regardless of whether a given unique-character is assigned to one interval or many intervals, for each unique character there will be a total real number length equal to the sum of all the lengths of all intervals to which the unique character is mapped. It would be possible to partition the range 516 into, e.g. four (or more) equally sized intervals. However, this approach would have the disadvantage that the interval associated with the most frequently-occurring character in the plaintext would have a relatively dense population of real numbers in the cyphertext. A would-be code-breaker might be able to discern the correspondence of, e.g. the most densely populated interval to the most frequent character. In order to prevent a would-be code-breaker from successfully identifying the interval associated with, e.g. the most-frequent letter or character in the cyphertext as the interval having the most dense distribution of real numbers in the cyphertext, in one embodiment the total length of all intervals associated with a given unique-character, relative to the length of the real number range L, should be substantially equal to the relative frequency with which that letter occurs in the cyphertext.

In the embodiment of FIG. 3, the total length of all intervals to which a character is mapped is roughly proportional to the relative frequency of that character in the plaintext. Accordingly, the relative frequency of a character is determined by dividing the actual number of occurrences of a given character by the actual number of occurrences of the least frequent character 314. Table III provides an illustration of performing this calculation with respect to the plaintext of Table I. For example, since the plaintext of Table I contains two "D's" (which is the least frequent character), its relative frequency $P_D$ is 1.0. Since the plaintext of Table I contains 14 A's, the relative frequency of A's is $P_A=14/2=7.0$ and so forth. The total of all the frequencies, as shown in Table III is 22 and (for purposes described below) one greater than this number (i.e. 23, in the example of Table III) is assigned to the symbol "t" 316.

TABLE III

| | NO. OF CHARACTERS | RELATIVE FREQUENCY $P_K$ | $P_K/t$ |
|---|---|---|---|
| Total Characters | 44 | | |
| A's | 14 | 7.0 | 0.309 |
| B's | 9 | 4.5 | 0.195 |
| C's | 19 | 9.5 | 0.413 |
| D's | 2 | 1.0 | 0.043 |
| Total | | 22 | |

The number of potential interval endpoints selected within the real number range 516, in the example of Table III, is twice the integer portion of t (i.e. 46 in the present example 318). This will define a "pool" of real numbers as potential interval endpoints from which selections will be made during the mapping step as described below. When it is desired to insert "red herring" real numbers in the cyphertext (to give the appearance of a random distribution of numbers, as described above), selecting twice the integer value of t (rather than the integer value of t) provides a partition of the real number range 516 which will have about twice as many intervals as will be used for the mapping, thus assuring that about 50% of the intervals in the range 516 will represent unmapped real numbers which can be used for "red herring" numbers. As will be clear to those of skill in the art, the integer portion of t may be multiplied by numbers other than 2 in order to provide any desired proportion of unmapped intervals to mapped intervals within the real number range 516 on average. Other schemes for selecting intervals from a real number range will be apparent to those of skill in the art after understanding the present disclosure.

FIG. 5A illustrates an example of a random selection of 46 points (represented by long or short vertical marks) within the real number range 516.

Figure 4:
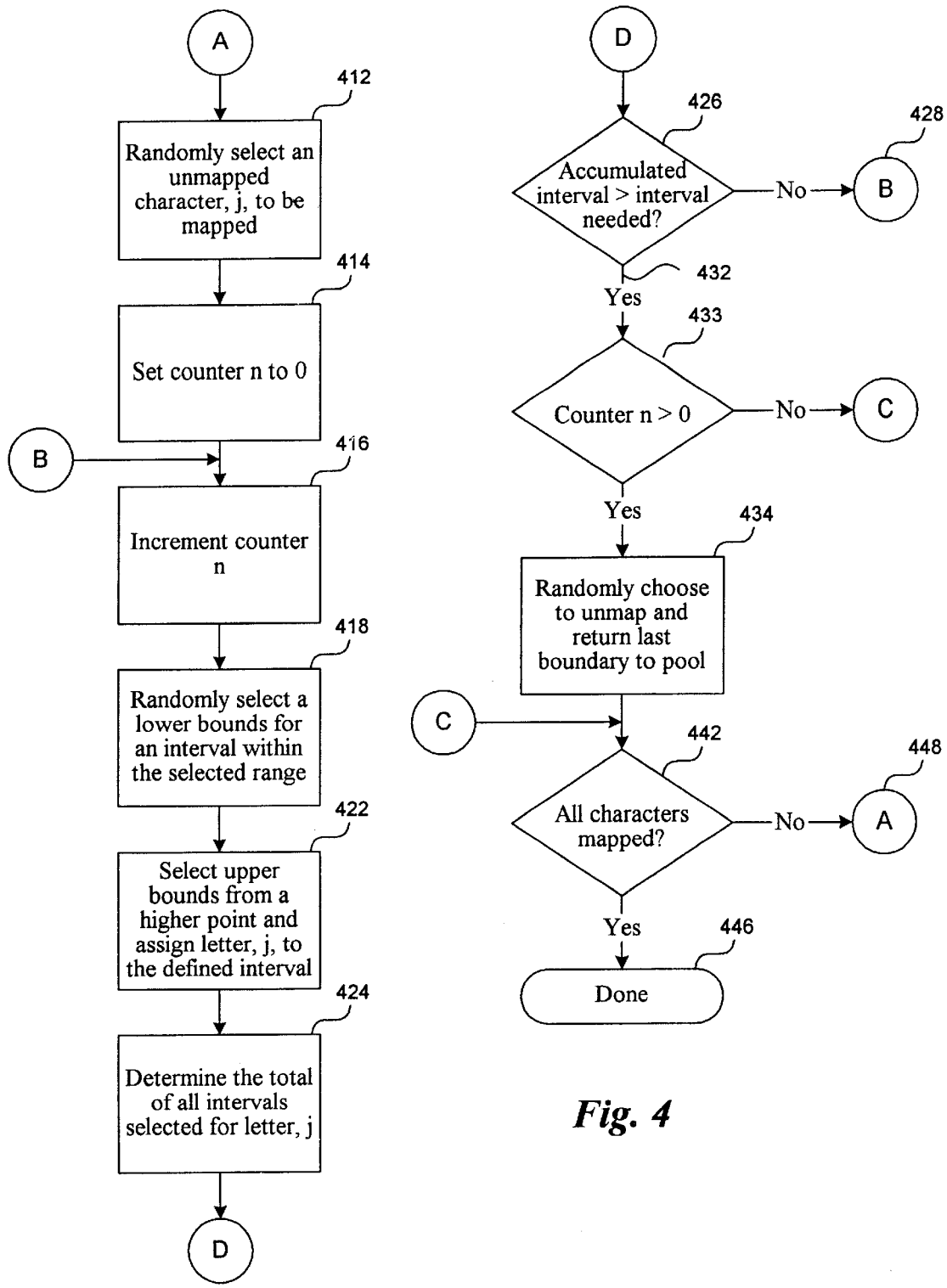
FIG. 4 is a flow chart depicting a mapping selection procedure according to an embodiment of the present invention.

As depicted in FIG. 4, after the real number range has been partitioned, each of the unique characters in the cyphertext (in this example, "A", "B", "C", "D") are mapped to intervals. Although it is possible to map the characters in a particular order, such as alphabetical order, letter frequency order or the like, in the embodiment of FIG. 4, the characters are mapped in random order. Thus, the first step is selecting one of the unique characters (which has not already been mapped) for mapping 412. For purposes of illustration, the selected character will be called the $j^{th}$ character. With reference to the illustration of Table I, in one example the randomly selected character may be "B". A counter variable $N_B$ is initialized to zero 414 and then incremented 416. One of the previously-determined 46 real numbers from the "pool" 318 (other than the highest number in the pool) is randomly selected and this is assigned 418 to the selected letter $j^{th}$ unique character (in this case "B") to act as the lower bound of one of the intervals. In the example of FIG. 5A, the randomly selected interval lower bound is 517 is 0.6437. The letter B is thus mapped to an interval $M_{1_B}$ whose lower bound is the randomly-selected point 517 and whose upper bound is another randomly selected point in the pool which is higher than the first randomly selected point, 518, in this example equal to 0.6988, to provide an interval $M_{1_B}$ having a length $L_{1_B}$ in this case equal to 0.0551. The end points for intervals selected in step 422 are illustrated, in FIG. 5A, by long vertical lines. The total accumulated length for the mapping of "B" characters is thus, at this point, equal to 0.0551 (since only a singular interval has thus far been mapped 424). This value is divided by the value of H (which in this case is equal to 0.47225, as noted above). The result, which is equal to, at this iteration of the present example, 0.1167 is compared to the ratio of $P_B/t$ (see Table III) 426. The comparison indicates that the total interval accumulated, thus far, for "B" characters is not yet equal to the relative probability of occurrence of "B" characters in the plaintext and thus the system loops 428 to repeat the procedure for mapping "B" to an additional interval 524, having a length $L_{2_B}$ (see Table II). After this iteration, $(L_{1_B}+L_{2_B})/H$ is still less than $(P_B)/t$ so the system once again returns 428 to map B 526 to yet a third interval. If it is assumed that this third interval to which B is mapped 526 has a length 528 of 0.535, than the value of $(L_{1_B}+L_{2_B}+L_{3_B})/H$ is now 0.132 and thus exceeds $P_B/t$ 426.

Thus, at this point in the procedure, the unique character "B" has been mapped to three intervals 522, 524, 526. As noted above, it is preferred that the length of the intervals, for each unique character (as a proportion of the length of all intervals for all characters), should be at least roughly proportional to the frequency of occurrence of that character in the plain text (e.g. in order to disguise such characteristics as letter frequency). In addition, in some embodiments, the number of intervals for each unique character (as a proportion of the total number of intervals mapped) should be roughly proportional to the frequency of occurrence of that character in the plaintext (in order to make it difficult to discern the intervals). However, there will always be an integral number of mappings while the relative frequency of a character in the plaintext will typically be non-integral. Thus, the number of mappings for a character will typically be the next larger or next smaller integer compared to the non-integral ratio. If it is desired to disguise mapped intervals from non-mapped intervals, it would be useful for the number of mappings for each unique character to be randomly selected between the next greater integer and the next smaller integer (compared to the character-frequency ratio). However, step 426 is constructed so that the loop 428 is not escaped until the number of mappings has reached the next-larger integer. Accordingly, in the embodiment of FIG. 4, after the loop 428 has been escaped 432, the procedure will randomly choose whether to unmap the most recent mapping (in this case, indicated by a phantom arrow 526 in FIG. 5A) and to return the bounds of the most-recently-mapped interval to the pool 434 (provided the mapping which is to be unmapped is not the only mapping for the character 433). In the present example, it is assumed that the random choice 432 results in removal of the most recent mapping for "B" 526 resulting in only two remaining mappings for "B", resulting in mappings: B→$^{M_{1_B}}$, B→$^{M_{2_B}}$ as depicted in Table II. Unless all characters in the character set have been mapped 432 (causing a termination of the mapping procedure 436), the system loops back 448 to select the next character in the character set for a mapping procedure.

FIG. 5A illustrates one example of the result of applying the procedure of FIG. 4 to the four-unique-character set of the characters in the plaintext of Table I and the intervals and lengths illustrated in the example of FIG. 5A are shown in Table II.

Figure 5B:
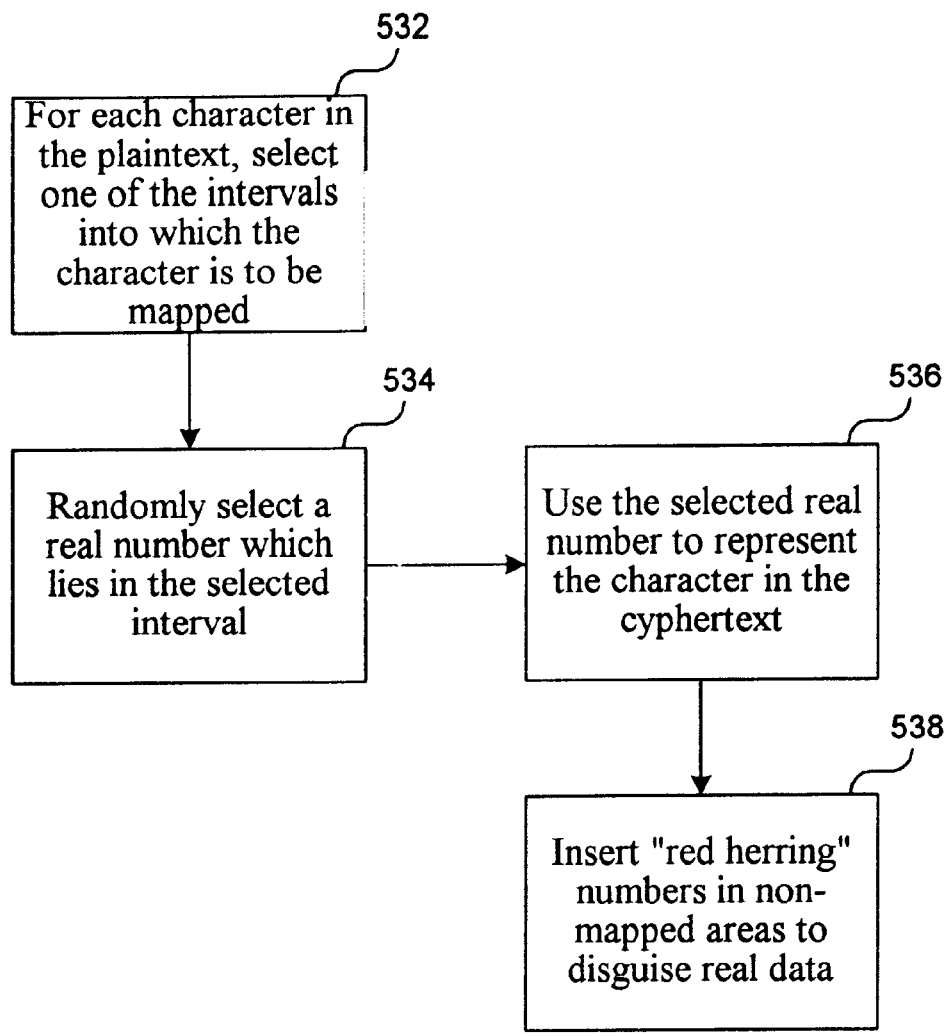
FIG. 5B is a flow chart illustrating a method which provides an apparently randomly distributed cyphertext according to an embodiment of the present invention.
Figure 5C:
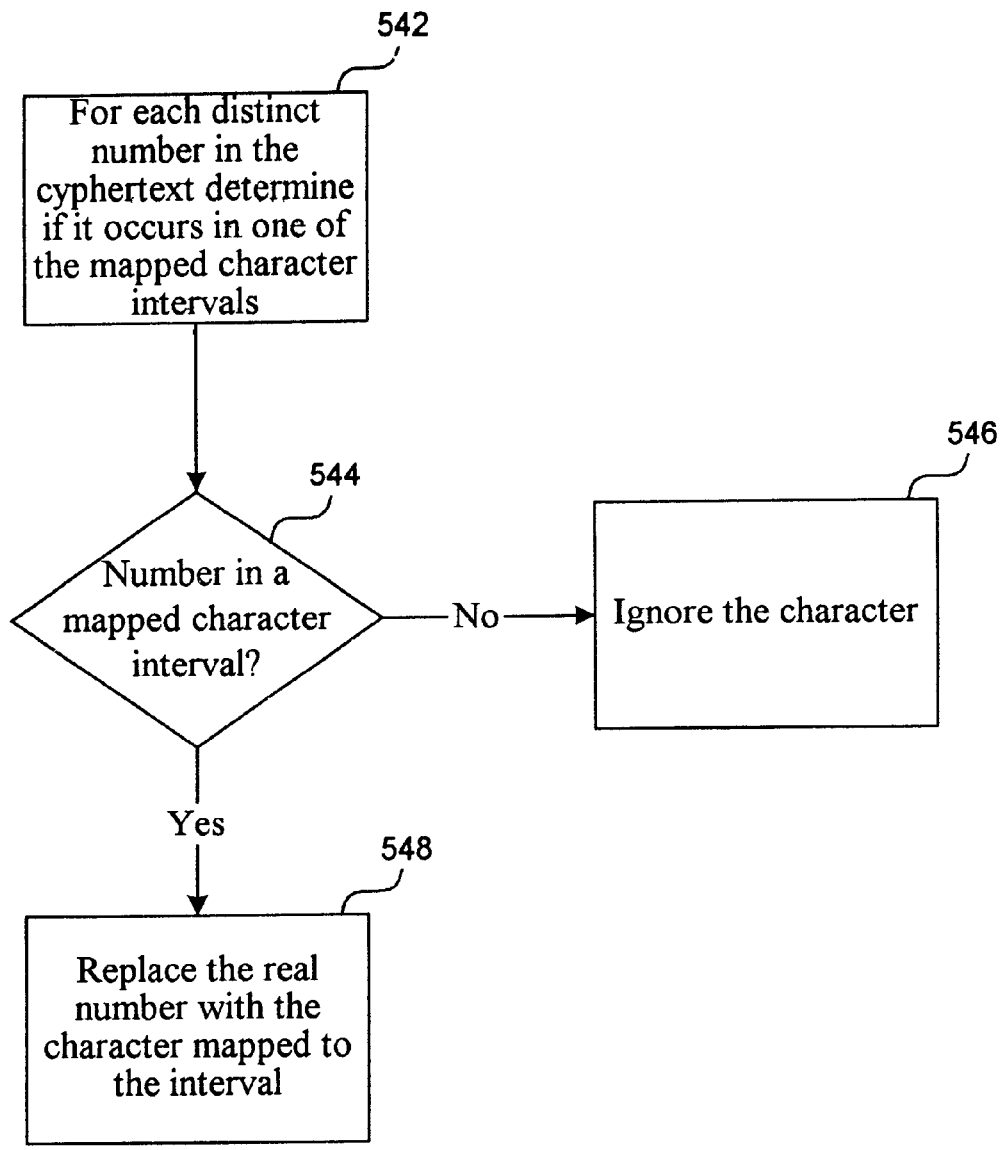
FIG. 5C is a flow chart illustrating a decryption procedure according to an embodiment of the present invention.

Once the intervals and mappings have been defined, encryption 116 can be performed e.g. using a procedure as shown in FIG. 5B. In the procedure of FIG. 5B, for each character in the plaintext (Table I) one of the intervals to which that character is mapped is randomly selected 512. For example, in the plaintext of Table I, the first character is "B". As noted above, B is mapped to two intervals 522, 524. Thus, the first step 512 is selecting which of these two mappings are to be used for the first "B" in the plaintext. For purposes of illustration, it is assumed that the selected mapping is $^{M_{2_B}}$ 524. The lower and upper bounds of this interval are 0.6437 and 0.6988.

A real number within the selected interval is then chosen to represent the character of the plaintext 516. For example, the first B of the plaintext might be represented by the number 0.6673. The same procedure 512, 514, 516 is used for selecting a real number to represent each character in the plaintext (Table I).

Thus, at this point, the 44 characters of the plaintext in Table I will have been replaced by 44 real numbers lying within the various intervals shown in Table II). However, a would-be code-breaker who examined such a series of real numbers (particularly one which corresponds to a relatively longer plaintext) might discern that all of the real numbers lie in only certain intervals and thus may be able to determine at least the boundaries of the intervals, as part of the process of code-breaking. Accordingly, in the embodiment of FIG. 5B, a number of "red herring" real numbers selected from portions of the real number range 516 which are outside the mapped intervals and are inserted 538 preferably at random locations in the cyphertext, preferably with insertion of "red herring" numbers being interspersed with selection of mapped numbers 534. The red herring numbers may be randomly selected or may be chosen so as to, in combination with the mapped real numbers, provide an appearance of a random distribution of real numbers within the real number range 516.

Returning to FIG. 1, following the encryption 116 of FIG. 5B, the resulting cyphertext is communicated 118 over a communication link 216 to a destination computer 214. The mapping and interval information 122 is also communicated to the destination computer 214, as described above. Various systems can be used for communicating the mapping and interval information. In one simple example, the mapping and interval information can consist of each letter of the character set followed by one or more pairs of real numbers representing the upper and lower bounds of the one or more intervals to which that character was mapped. Of course, it would be relatively straightforward for a would-be codebreaker to use such interval/mapping communications to assist in decrypting the cyphertext. Accordingly, various procedures can be used for further protecting the communication of the mapping/interval information. As noted above, the mapping/interval information can be, itself, encrypted. The definition of the intervals can be transmitted separately (at different time or using a different communication channel) from the information regarding mapping such as using a prior day's transmission as a key for a current day's transmission. For example, a first communication can be used to transmit pairs of real numbers representing upper and lower bounds of intervals (or, for contiguous intervals, all lower bounds, plus the upper bound of the largest interval) and a second communication can be used to transmit a string of characters indicating (e.g. in the same order) which characters are mapped to which intervals. Alternatively, interval definitions can be communicated by sending a center point and width rather than end points. Those that are skilled in the art will understand how to devise other ways of communicating mapping and interval information after understanding the present disclosure.

After the cyphertext and mapping/interval information have been communicated to the destination, the destination computer can decrypt the cyphertext to recover the original plaintext. In the procedure of FIG. 5C, the destination computer will receive a series of real numbers as the cyphertext. For each discrete real number, the computer will determine whether that real number lies within one of the intervals to which one of the characters is mapped 542. If the number does not lie within one of the mapped-to intervals 544, it can be assumed that the number was one of the red herring numbers selected from the non-mapped intervals and these numbers can be ignored 546. Otherwise, the real number will be replaced with the character which is mapped to that interval 548. In the example above, the first character of the plaintext of Table I was represented by the real number 0.6673. Thus, during decryption, the destination computer will determine that 0.6673 lies within one of the mapped-to intervals, namely interval $^{M_{2_B}}$. The computer will know that this interval is one of the intervals to which the letter "B" is mapped and accordingly will replace the number 0.6673 with the letter "B" thus recovering the first character of the plaintext of Table I.

The description above is generally related to communications between two computers, a source computer and a destination computer as illustrated in FIG. 2. However, as noted above, there are situations in which it is desirable for other parties to be involved in the communication process, e.g. to communicate such third-party's approval or verification of the transaction or communication. One procedure for involving additional parties can involve dividing the character set into two or more subsets and permitting different parties to define the mappings and/or intervals for the different subsets of characters. Thus (in the example of Table I) a first party might define the intervals and mapping for characters A and B and a second party might define the intervals and mapping for characters C and D. In this way, a receiving party who was able to successfully decrypt the cyphertext could be assured that both of the parties who contributed to the encryption of the plaintext (and had communicated the mapping/interval information to the receiving party) had done so in order to indicate their verification or approval of the communication or transaction. While this procedure may be useful in many situations, in other situations it may be desired to provide for multiple-party contribution to encryption but without all of the contributing parties (or, in some cases, any of the contributing parties) having the ability to decrypt the cyphertext (or, preferably, any portion thereof) using only their own contributions to the encryption process. Thus, when two parties each define intervals and mappings for some of the character set, that party would be able to recover the portion of the plaintext which uses characters for which that party had defined the mapping. Thus, in the example above, the first contributing party, if they intercepted the cyphertext, would be able to recover all of the A's and B's of the plaintext.

Figure 6:
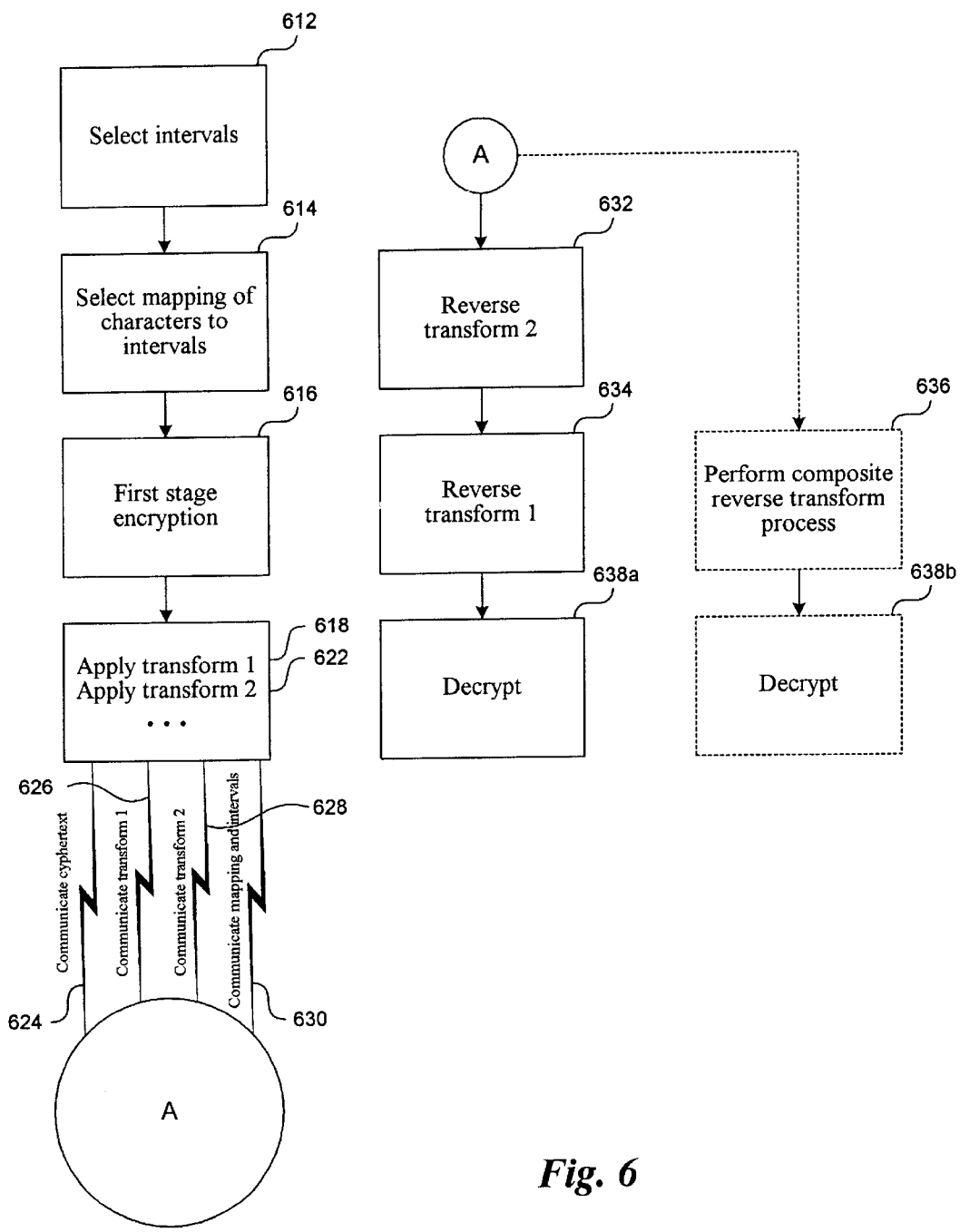
FIG. 6 is a flow chart depicting a data mapping procedure according to an embodiment of the present invention.
Figure 7:
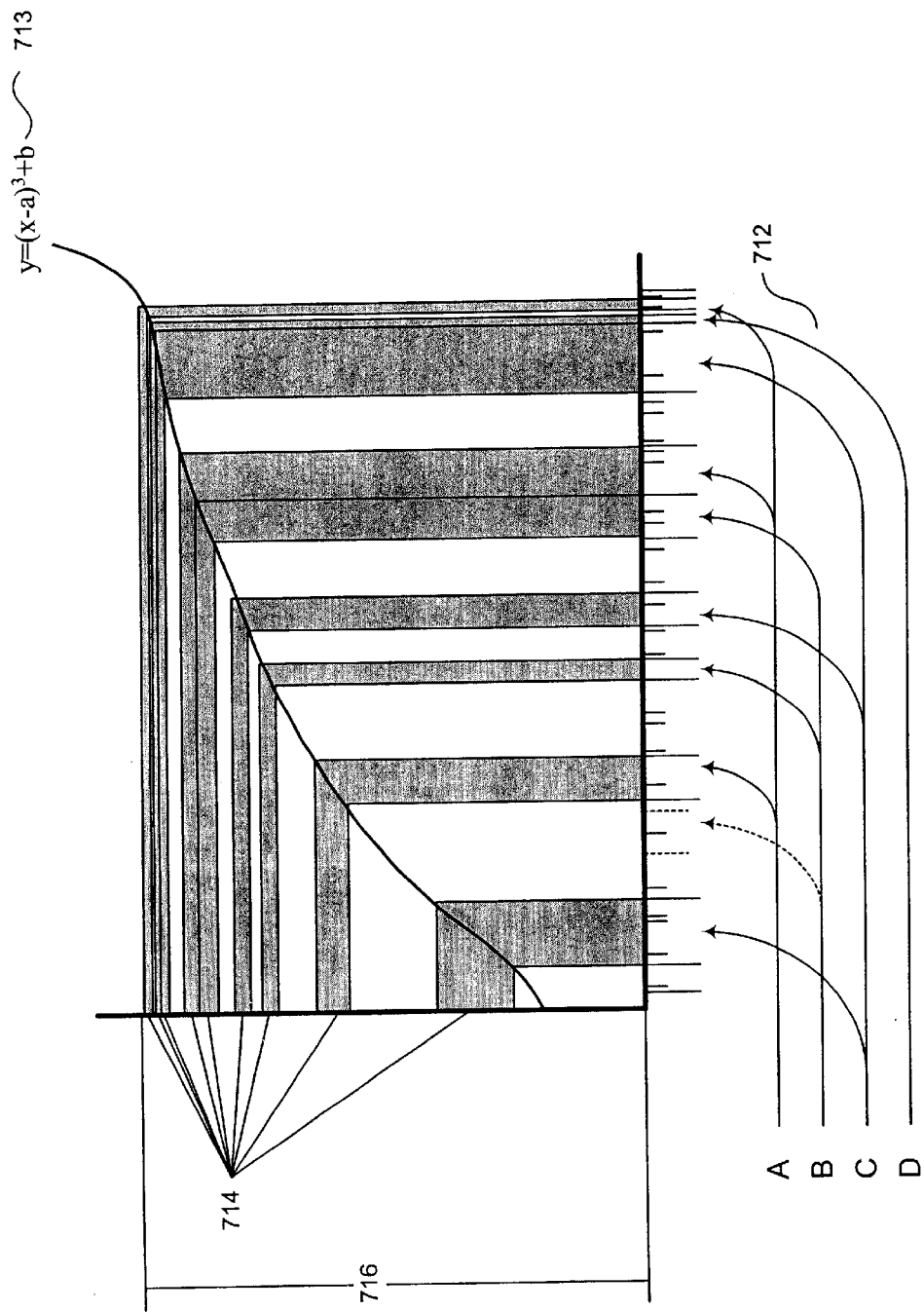
FIG. 7 is an illustration of a monotone function transformation of an interval mapping according to an embodiment of the present invention.

Accordingly, another procedure, illustrated in FIGS. 6 and 7 can be used to achieve multi-party encryption without contributing-party decryption. In the embodiment of FIG. 6, initial steps of selecting intervals 612, selecting mappings 614 and performing a first stage of encryption 616 can be performed in a fashion similar to that described above for corresponding steps 112, 114, 116 of FIG. 1. Alternatively, the selection of intervals and mapping can be shared among two or more parties, as described above. As described above in connection with FIG. 1, the result of the first stage of encryption 616 will be a series of real numbers. The mapping of letters ABCD to intervals is illustrated in FIG. 7, by arrows 712.

As is well known to those of skill in the art, there are numerous mathematical functions which can be used to transform one set of real numbers into another set of real numbers. Moreover, functions are known which can be multiplied such that a second function can be applied to the real number set resulting from a first function, in order to yield a third real number set. For purposes of at least some embodiments of the present invention, the transformation function(s) that may be used should be configured such that one or more reverse functions or inverse functions are available (or can be derived) so as to permit unambiguous recovery of the original set of real numbers. Finally, for at least some embodiments the functions should operate so that, at least for the various real numbers sets, and preferably for all real numbers in the mapped intervals, and even more preferably for all real numbers in the real number region, a transformation function will never result in two different real numbers being transformed to the same real number. Conveniently, this can be assured by using transformation functions which are continuous and monotonic in the mapped intervals (preferably in the selected real number range). As will be understood by those of skill in the art, for any selected real number range, there are numerous polynomial equations that are continuous and monotonic in such range. Other suitable transformation functions can be selected as will be understood by those of skill in the art after understanding the present disclosure.

FIG. 7 illustrates intervals position on a portioned of the X axis of a Cartesian coordinate system with a graph of a suitable cubic equation $Y=(X-A)^3+B$. The illustrated cubic equation is continuous and monotonic increasing in the illustrated interval. As shown in FIG. 7, endpoints of each selected interval can be transformed to endpoints of a corresponding "Y" interval by application of the cubic equation to define a series of corresponding intervals 714 on the Y axis. If desired, the interval 714 resulting from the first transformation function 713 can be further transformed by another function which is preferably continuous and monotonic over the length 716 of the Y-axis intervals to provide yet another series of intervals (not shown) and so forth. In one embodiment, each of one or more verifying parties can define a transformation function for use in the procedure of FIG. 6. As illustrated in FIG. 6, a first transformation function 618 (devised by a first verification party) is applied to the set of real numbers output by the first state encryption 616 to yield a second set of real numbers, to which a second transformation function 622 (devised by a second verification party 234) is applied in order to arrive at the cyphertext which is communicated 624 e.g. over communication link 216 to the destination computer 214. Although it would be possible for the source computer 212 to send the first stage-encrypted text to the first verifying party 232 for transformation by the first verifying party 232 and for transmission on to the second verifying party 234 for the performance of the second transmission and, thence, transmission to the destination computer 216, FIG. 2 illustrates a somewhat different procedure. In the procedure of FIG. 2, each of the first and second verification party computers 232, 234 sends the information defining the transformation functions (e.g. such as the parameters of a cubic equation in the example of function 713) to the source computer 212 via communication links 3 and 4 236, 238. The source computer 212 then sends the cyphertext 624 via the first communication link 216 and the mapping and interval information 630 by a second communication link 218. The first verifying party 232 sends the first transformation information 626 by a fifth communication link 242 to the destination computer 214 and the second verifying party sends the second transformation information 628 by a sixth communication link 244 to the destination computer 214. If desired, the verifying parties, rather than sending the values of the transformation functions (which were sent to the source computer 212) can send inverse function information. This procedure can be useful when the transformed functions have different levels of difficulty of operation and inverse operation. The destination computer 214 performs second and first inverse transform operations 632, 634 (using inverse transform information communicated from the verifying parties or calculated from the transform information sent from the verifying parties). Many real number functions are commutative so that the reverse inverse transformations can be performed in either order. Many real number functions can be multiplied so that, as an alternative, the inverse functions can be multiplied to form a single composite inverse fiction which is then applied 636 to the cyphertext. The resulting "original" set of real numbers can then be decrypted 638*a*, *b*, e.g. using procedures similar to that described above in connection with FIG. 5C. Accordingly, although the destination party can be assured that the first and second verification parties 232, 234 contributed to the encryption process, to indicate their authorization or verification, neither of the verifying parties 232, 234 is able, using only their transformation function contribution, to recover the plaintext.

FIG. 7 depicts an embodiment in which the second transformation function is a continuous monotonic function. However, it is also possible to provide a workable encryption system in which the second function is discontinuous and/or non-monotonic. For example, as illustrated in FIG. 8, the second function can be a step function (i.e. a function in which each of a plurality of intervals in the range may map to a single value in the domain) 812*a* through 812*g*. As can be seen from FIG. 8, in this embodiment, the function is not necessarily monotonic nor continuous. As illustrated in the example depicted in FIG. 8, there may be two or more intervals (e.g. 812*a,e*) which map onto the same domain value. Although, in decrypting the cyphertext, there may be ambiguity which arises from the non-monotonic nature of the second transformation function, if the characters of the document, as they are encrypted, are kept in order, it becomes feasible to decrypt the cyphertext (because the cyphertext retains not only the numbering or functional relationship between the cyphertext and the plain text but also the relative position information).

In light of the above description, a number of advantages of the present invention can be seen. The present invention allows encryption of a plaintext in such a manner that different instances (preferably all different instances) of the same character within the plaintext are represented by different cyphertext components, such as different real numbers. Nevertheless, a single decryption procedure applied to such different numbers correctly decrypts the different numbers to the same plaintext character. In this way, information that might be of use to a code-breaker, such as letter frequency information, word size information and the like, can be reduced or eliminated from the cyphertext. Preferably, the cyphertext appears to be a series of numbers randomly distributed over a range of real numbers. By avoiding a one-to-one system of encryption, the disadvantages associated with such encryption systems are avoided. The present invention allows the participation of two or more parties in the encryption process e.g. for purposes of indicating verification or approval of various parties to the communication or transaction. In some embodiments of invention, such participation of multiple parties can be achieved without providing such verifying parties with the ability to recover all, or preferably any portion of, the plaintext from the cyphertext, using only that party's contribution to the encryption process.

A number of variations and modifications can be used. It is possible to use some aspects of the invention without using others. For example, it is possible to use the described one-to-many "encryption" without using transformation functions or other multi-party participation processes. It is possible to use multiple transformation functions or other multiple party encryption procedures without using the described mapping of characters to intervals. Many of the steps in the procedures described herein can be performed in an order different from that illustrated. For example, with regard to the procedure of FIG. 6, rather than performing the encryption first stage and then applying the transforms 618 622 to the resultant set of real numbers, the transform 618 612 can be applied to the interval boundaries before characters of plaintext are mapped to real numbers within the intervals. Although one example was provided illustrating two different parties defining the intervals and mappings for two different portions of the character set, it is also possible for one party to define the interval bounds and another party to define the mapping (for all or some portion of the character set).

The above-described one-to-many mapping can result in a cyphertext which includes a series of real numbers if desired, the real numbers in the cyphertext can be concatinated and, if the numbers have a known or a determinable number of digits or bits, can be transmitted simply as a stream of such digits or bits, with the decryption party having the ability to break the stream into real numbers having the known number of bits or digits. In some embodiments, it may be desirable to translate real numbers from one number system to another such as decimal to octal, hexadecimal, binary and the like either before or after any given stage of the encryption. If number system changes are performed, rounding errors that may occur during number system transformations should be accounted for, e.g. using techniques that will be understood by those of skill in the art after understanding the present disclosure. As described above, the intervals and mappings can be selected such that the resultant series of real numbers appears to be randomly distributed over an interval of the number line. Typically, applications of one or more transformation functions will distort the apparent random distribution so that the resultant cyphertext may no longer appear to be a randomly distributed series of real numbers. However, the distortion that results is dependent on the nature of the transformation functions and is independent of the plaintext. Accordingly, even if the final cyphertext contains numbers that do not appear to be randomly distributed, the departure from randomness will not contain information about the letter frequency or similar characteristics of the plaintext. However, if it is known that the "original" series of random numbers (on which the transformation function(s) operated) was random, the nature of the departures from randomness might be useful in determining the transformation functions. If this is a concern, in one embodiment the original intervals and mapping may be selected (or extra-interval "red herring" numbers may be inserted) so that the "original" series of random numbers is not apparently randomly distributed. Thus any departures from randomness in the transformed real number series will be of little use in determining the nature of the transformations.

EXAMPLE

The following provides one example of a use of the procedure as described herein. The example involves a source "branch" bank, the source's "parent" bank, a destination bank, and a verifying federal reserve bank. The source branch bank initiates communication with its parent by defining a set of intervals for a character set. In this example, the character set is chiefly numbers and includes 15 characters (including decimal point, minus sign, currency symbol, space and the like). Five intervals are assigned to each character. The intervals in this example are contiguous. Accordingly, the intervals can be communicated by transmitting a set of 76 numbers, in this case, double precision numbers. This can be communicated using a total of 608 bytes. In one embodiment, the branch bank and its parent bank establish such a set of intervals on a periodic basis, such as hourly. The source branch calls its parent bank which assigns a unique transaction identification number to the source bank's transaction. The source bank then calls the destination bank to obtain an authentication code. This code consists of the coefficients of a simple polynomial such as a cubic polynomial. The polynomial is chosen to be monotone increasing over the range of intervals defined in the first step. The coefficients of the cubic polynomial can be transmitted using four double precision numbers or 32 bytes. The source bank then contacts the verifying Federal Reserve Bank and obtains another set of authentication codes (corresponding to coefficients of a polynomial which is monotone over the range of intervals), thus obtaining another 32 bytes. The source (branch) bank then encrypts the document which it wishes to transmit using the 3 pieces of authentication data: the interval/mapping information, the first polynomial coefficients and the second polynomial coefficients. The encrypted document is then sent to the destination bank as cyphertext, along with the transaction identification number in plaintext. The destination bank calls each of the parent bank and the Federal Reserve Bank and provides them with the transaction identification number and their own bank identification number. In response, the parent bank and the Federal Reserve Bank transmit to the destination bank, the respective authentication/encryption information. Using this information, the destination bank decrypts the transmission and is thus assured that the transmission has been authorized by both the parent bank and the Federal Reserve Bank.

The present invention, in various embodiments, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g. for improving performance, achieving ease and\or reducing cost of implementation.

The foregoing discussion of the invention has been presented for purposes of illustration and description. The foregoing is not intended to limit the invention to the form or forms disclosed herein. Although the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangable and/or equivalent structures , functions, ranges or steps are disclosed herein, and without intending to publicly dedicate any patentable subject matter.

What is claimed is:

1. A method for secure communication of a message made up of characters selected from a character set comprising:
   associating at least some of said characters in said character set with at least one associated interval of numbers to define a mapping, each interval of numbers having an upper bound and a lower bound, wherein a first party selects said intervals and a second, different party selects said mapping;
   for each character in said message, transmitting, to a destination, data based on a selected number, selected from an interval associated with said character.

2. A method, as claimed in claim 1, wherein:
   at least one character in said character set is associated with at least two different intervals.

3. A method, as claimed in claim 1, wherein:
   said intervals do not overlap.

4. A method, as claimed in claim 1, wherein:
   at least two successive intervals are non-contiguous.

5. A method as claimed in claim 1, wherein:
   all intervals are contiguous such that, except for the lower bound of the smallest interval, the upper bound of each interval equals the lower bound of another interval.

6. A method, as claimed in claim 1, wherein:
   said data based on a number is equal to said number.

7. A method, as claimed in claim 1, wherein:
   said data based on a number is a mapped number wherein said mapped number is the result of applying a function to said selected number.

8. A method, as claimed in claim 7, wherein:
   said function is monotonic at least in over a number range encompassing all said intervals.

9. A method as claimed in claim 7, wherein;
   said function comprises a step function.

10. A method, as claimed in claim 7, wherein:
    said function is the product of at least first and second different functions.

11. A method, as claimed in claim 10, wherein:
    the first party selects at least said first function and the second, different party selects at least said second function.

12. A method, as claimed in claim 7 further comprising:
    communicating information, defining an inverse of said function to said destination.

13. A method, as claimed in claim 1, further comprising:
    communicating decryption information to said destination; and decrypting said data using said decryption information, to recover said message.

14. A method, as claimed in claim 13, wherein:
    said decryption information includes information defining said intervals.

15. A method, as claimed in claim 13, wherein:
    said decryption information includes information defining said mapping.

16. A method for secure communication of a message made up of characters selected from a character set, the method comprising:
    associating at least some of said characters in said character set with at least one associated interval of numbers to define a mapping, each interval of numbers having an upper bound and a lower bound;
    for each character in said message, transmitting, to a destination, data based on a selected number, selected from an interval associated with said character, wherein said data is a mapped number resulting from applying a step function to said selected number.

17. A method for secure communication of a message made up of characters selected from a character set, the method comprising:
    associating at least some of said characters in said character set with at least one associated interval of numbers to define a mapping, each interval of numbers having an upper bound and a lower bound;
    for each character in said message, transmitting, to a destination, data based on a selected number, selected from an interval associated with said character, wherein said data is a mapped number resulting from applying a function to said selected number, wherein said function is the product of at least first and second different functions, where a first party selects at least said first function and a second, different party selects at least said second function.

18. A method for secure communication of a message made up of characters selected from a character set, the method comprising:
    associating at least some of said characters in said character set with at least one associated interval of numbers to define a mapping, each interval of numbers having an upper bound and a lower bound, wherein a first party selects said mapping for a first subset of said character set and a second, different party selects said mapping for a second subset of said character set;
    for each character in said message, transmitting, to a destination, data based on a selected number, selected from an interval associated with said character.

* * * * *

UNITED STATES PATENT AND TRADEMARK OFFICE
CERTIFICATE OF CORRECTION

PATENT NO.    : 6,438,230 B1
DATED         : August 20, 2002
INVENTOR(S)   : David Moore It is certified that error appears in the above-identified patent and that said Letters Patent is hereby corrected as shown below:

Column 1,
Line 59, "modem" should read -- modern --;

Column 14,
Line 34, "fiction" should be -- function --;

Column 17,
Line 57, "wherein;" should be -- wherein: --;

Signed and Sealed this

Eighteenth Day of February, 2003

JAMES E. ROGAN
*Director of the United States Patent and Trademark Office*